(12) United States Patent
Bermel (10) Patent No.: US 6,674,357 B1
(45) Date of Patent: Jan. 6, 2004

(54) INFORMATIONAL MESSAGES DISPLAY SYSTEM FOR MASS TRANSIT SYSTEMS AND METHOD FOR SAME

(75) Inventor: Paul Bermel, Atlanta, GA (US)

(73) Assignee: The Transit Grapewine, LLC, Atlanta, GA (US)

( * ) Notice: Subject to any disclaimer, the term of this patent is extended or adjusted under 35 U.S.C. 154(b) by 518 days.

(21) Appl. No.: 09/710,553

(22) Filed: Nov. 11, 2000

Related U.S. Application Data
(60) Provisional application No. 60/165,387, filed on Nov. 12, 1999.

(51) Int. Cl.[7] .............................. G08B 5/22; H04Q 1/30; H04Q 7/00
(52) U.S. Cl. .................... 340/7.55; 340/7.43; 340/7.45; 340/7.48
(58) Field of Search ............................... 340/7.48, 7.45, 340/7.43, 7.39, 7.38, 7.35, 7.55, 825.26, 825.27; 455/412.1, 49.1, 70, 67, 345; 709/219, 236; 705/14–16, 27

(56) References Cited

U.S. PATENT DOCUMENTS

| | | | |
|---|---|---|---|
| 3,614,727 A | 10/1971 | Fritts | 340/22 |
| 4,812,843 A | 3/1989 | Champion, III et al. | 340/905 |
| 4,967,194 A | 10/1990 | Haruki | 340/825.44 |
| 5,504,476 A * | 4/1996 | Marrs et al. | 340/7.48 |
| 5,508,695 A * | 4/1996 | Nelson et al. | 340/825.37 |
| 5,729,214 A | 3/1998 | Moore | 340/905 |
| 5,778,577 A | 7/1998 | Bailey | 40/450 |
| 5,850,190 A | 12/1998 | Wicks et al. | 340/905 |
| 5,867,110 A | 2/1999 | Naito et al. | 340/995 |
| 5,877,699 A | 3/1999 | Sharpe et al. | 340/825.44 |
| 5,893,075 A | 4/1999 | Plainfield et al. | 705/14 |
| 5,898,384 A | 4/1999 | Alt et al. | 340/825.36 |
| 5,933,811 A | 8/1999 | Angles et al. | 705/14 |
| 5,948,061 A | 9/1999 | Merriman et al. | 702/219 |
| 5,966,068 A | 10/1999 | Wicks et al. | 340/286.01 |
| 5,974,396 A | 10/1999 | Anderson et al. | 704/10 |
| 5,978,654 A | 11/1999 | Colwell et al. | 455/31.1 |
| 5,992,888 A | 11/1999 | North et al. | 283/56 |
| 5,995,942 A | 11/1999 | Smith et al. | 705/14 |
| 6,006,159 A | 12/1999 | Schmier et al. | 701/200 |
| 6,016,107 A | 1/2000 | Kampe et al. | 340/825.44 |
| 6,021,433 A | 2/2000 | Payne et al. | 709/219 |
| 6,026,369 A | 2/2000 | Capek | 705/14 |
| 6,073,727 A * | 6/2000 | DiFranza et al. | 187/396 |
| 6,088,457 A | 7/2000 | Parkinson et al. | 380/270 |
| 6,250,428 B1 * | 6/2001 | Amo et al. | 187/391 |

(List continued on next page.)

OTHER PUBLICATIONS

The Transit Network. Brochure. 3102 Maple Ave., Suite 230, Dallas Texas 75201. (Undated).

(List continued on next page.)

Primary Examiner—Michael Horabik
Assistant Examiner—Nam Nguyen
(74) Attorney, Agent, or Firm—Stites & Harbison, PLLC; David W. Nagle, Jr.

(57) ABSTRACT

An apparatus (10) for displaying informational messages communicated by wireless apparatus to selected ones of a plurality of display devices (16) and displayed in a sequence of such informational messages, having message sources (18, 20, 22) such as news and advertising sources that create a plurality of message records (34) which each have a cap code (36), a pin code (37) which identifies one of a plurality of message memory slots associated with the particular display device (16) to receive the message, a message (38) and at least one display characteristic (40) for the message. The cap code (36) uses conventional messaging apparatus to designate the display devices (16) to receive a particular message record (34). Each display device (16) has storage (44) for storing a plurality of communicated messages and associated display characteristics therefore based on the pin code (37) and a visual display screen (46) for displaying the stored messages based on the display characteristics for each of said stored messages. A method of displaying informational messages is disclosed.

5 Claims, 6 Drawing Sheets

U.S. PATENT DOCUMENTS

| | | | |
|---|---|---|---|
| 5,061,921 A | | 10/1991 | Lesko et al. ............ 340/815.24 |
| 5,187,810 A | | 2/1993 | Yoneyama et al. ......... 455/34.1 |
| 5,214,793 A | | 5/1993 | Conway et al. ............ 455/49.1 |
| 5,218,629 A | * | 6/1993 | Dumond et al. .......... 455/412.1 |
| 5,257,020 A | | 10/1993 | Morse ..................... 340/908.1 |
| 5,293,484 A | | 3/1994 | Dabbs, III et al. .......... 395/164 |
| 5,398,021 A | * | 3/1995 | Moore .................. 340/825.27 |
| 5,400,020 A | | 3/1995 | Jones et al. ................. 340/994 |
| 5,446,678 A | | 8/1995 | Saltzstein et al. ....... 364/514 R |
| 5,459,482 A | | 10/1995 | Orlen .......................... 345/98 |

OTHER PUBLICATIONS

Motorola Creata Link 2XT. Brochure. 1500 Gateway Blvd., Boynton Beach, Florida 33426. 1998.

Alstom Telecite. Products & Services—Architecture. www.telecite.com.

Alstom Telecite. Products & Services—Products—Visual Communication Network (VCN!). www.telecite.com.

Alstom Telecite. Products & Services—Display Options. www.telecite.com.

Alstom Telecite. Products & Services—Applications. www.telecite.com.

Alstrom Telecite. Product & Services —Services. www.telecite.com.

Alstom Telecite, Products & Services—Technology. www.telecite.com.

Alstom Telecite. Advertise in Montreal's Metro. www.telecite.com.

Alstom Telecite. Newsroom. Telecite on track for $18 million Hong Kong contract! Press Release. Oct. 23, 1998. www.telecite.com.

Alstom Telecite. Newsroom. Telecite's VCN in Transit Bus Application! Press Release. Oct. 8, 1999. www.telecite.com.

Alstom Telecite. Newsroom. Telecite to supply VCN displays for NYCT's R–143 cars! Press Release. May 24, 1996. www.telecite.com.

Alstom Telecite. Newsroom. Alstom announces acquistion of Telecite! Press Release. Oct. 11, 1999. www.telecite.com.

Alstom Telecite. The Company–Milestones. www.telecite.com.

* cited by examiner

| CAP CODE | PIN CODE | MESSAGE | DISPLAY CHARACTERISTIC(S) |
|---|---|---|---|

FIG.3

| CAP CODE (1) | PIN CODE (1) | MESSAGE (1) | DISPLAY CHARACTERISTICS (1) |
|---|---|---|---|
| CAP CODE (2) | PIN CODE (2) | MESSAGE (2) | DISPLAY CHARACTERISTICS (2) |
| CAP CODE (3) | PIN CODE (3) | MESSAGE (3) | DISPLAY CHARACTERISTICS (3) |
| ⋮ | ⋮ | ⋮ | ⋮ |
| CAP CODE (n) | PIN CODE (n) | MESSAGE (n) | DISPLAY CHARACTERISTICS (n) |

INFORMATIONAL MESSAGES DISPLAY SYSTEM FOR MASS TRANSIT SYSTEMS AND METHOD FOR SAME

This application claims priority based on provisional patent application serial No. 60/165,387, filed Nov. 12, 1999.

TECHNICAL FIELD

The present invention relates to apparatus and methods for communicating informational messages to the public. More particularly, the present invention relates to informational messages communicated from message sources such as news and advertising sources by wireless technology to a plurality of display devices available for viewing by the public and particular at mass transit systems including display devices located in mass transit stations and on mass transit vehicles for display of the informational messages to the public.

BACKGROUND OF THE INVENTION

Transit systems such as bus, train, and aircraft, as well as roadways with personal passenger and commercial vehicles, provide transportation for persons and packages among numerous locations. Often, for persons, the transit system is used for everyday commuting between homes and work. The transit systems have a number of stations at which vehicles for transporting persons arrive and depart. The stations are distributed in the areas served by the transit system. The persons come to the stations to use the transit services. Generally, the persons gather in increasing numbers as the time approaches for the vehicle to arrive. Persons at the station who do not board the vehicle wait for the next vehicle. Commuter transit typically involves regular, periodic arrivals of vehicles throughout the day, pursuant to schedules of arrival and departures for facilitating the travel of persons in the area served by the transit system.

The gathering of persons at transit stations provides opportunities to communicate information. Particularly, advertisers find that persons waiting at transit stations for vehicles provides an opportunity to present commercial messages to an audience with reduced distractions to seeing the commercial message. Often, transit stations include printed poster billboard advertisements promoting the goods and services of the entity being advertised. These billboards are posters or other displays which are changed from time-to-time, generally monthly or longer intervals.

In addition, the transit system communicates messages to the persons at the stations. Often there are fixed signs that identify the station. Temporary signs may be placed to advise persons of changes that may affect certain persons using the transit system, such as advising of a closed station, a canceled or changed schedule, and the like. In other circumstances, the transit systems make audio announcements over loudspeakers to advise persons of information.

Persons waiting for transit vehicles also read newspapers and magazines, to help pass the idle time until the vehicle arrives.

While these communication devices are useful, there are drawbacks to their use. Billboard display advertising is significantly labor intensive. The advertising must be prepared and approved, with printing well in advance of subsequent installation of the advertising in the various stations. The advertising therefore is more general in nature, and it is costly and time consuming to attempt having the advertising be responsive to weekly or daily events. Further, different approaches to promoting the benefits of the advertiser are more difficult to implement. Advertisements targeted to one area may not be as effective in another area. Placing printed signs by transit systems to communicate timely information about changes to schedules is labor consuming. Small placard signs positioned in entryways may not be observed, and events may be unfolding quickly such that signage is not effectively communicating current accurate information. For persons waiting for vehicles, idle time may be wasted due to lack of newspaper or other reading material.

Accordingly, there is a need in the art for an improved informational messages display system for public facilities, particularly mass transit systems including stations and transit vehicles, and a method of communicating informational messages for display to persons using public facilities such as transit systems. It is to such that the present invention is directed.

BRIEF SUMMARY OF THE INVENTION

The present invention meets the need in the art by providing apparatus and methods for displaying informational messages on display devices available for viewing by persons and particularly for persons using mass transit systems including displays in mass transit stations and on mass transit vehicles, which informational messages are communicated from at least one message source by wireless apparatus to at least one of a plurality of display devices. The present invention comprises at least one message source for creating a plurality of message records, each message record having a cap code which identifies a selected one of a plurality of display devices, a pin code which identifies one of a plurality of message memory slots associated with the particular display device to receive the message, a message and at least one display characteristic for the message. Each one of the plurality of display devices has a storage means that defines the plurality of message memory slots for storing a plurality of communicated messages and the display characteristics associated with said communicated messages. The display device has a transceiver which receives the message and the display characteristics therefore based on the cap code The transceiver also selectively acknowledges receipt of the message. Each display device has a visual display screen for displaying the stored messages based on the display characteristics for each of said stored messages. A controller associated with each display device displays in a selected sequence the plurality of messages based on the display characteristics associated with each message.

In another aspect, the present invention provides a method of displaying informational messages communicated from at least one message source by wireless apparatus to a plurality of display devices available to the public, and particularly such display devices associated with mass transit systems having display devices located in mass transit stations and on transit vehicles, for display of the informational messages to the public, comprising the steps of:

(a) creating a plurality of message records, each message record generated by a message source, each message record having a cap code which identifies the display device which is to receive the message, a pin code which identifies one of a plurality of message memory slots associated with the particular display device to receive the message, a message, and at least one display characteristic associated with the message;

(b) communicating each of the message records from the message source to at least one of a plurality of display devices based on the cap code;

(c) storing the display characteristics and the message in one of the message memory slots of a memory device of the display device based on the pin code; and (d) displaying in a selected sequence the plurality of messages based on the display characteristics associated with each message.

Objects, advantages and features of the present invention will become apparent from a reading of the following detailed description of the invention and claims in view of the appended drawings.

DETAILED DESCRIPTION OF THE PREFERRED EMBODIMENTS

Figure 1:
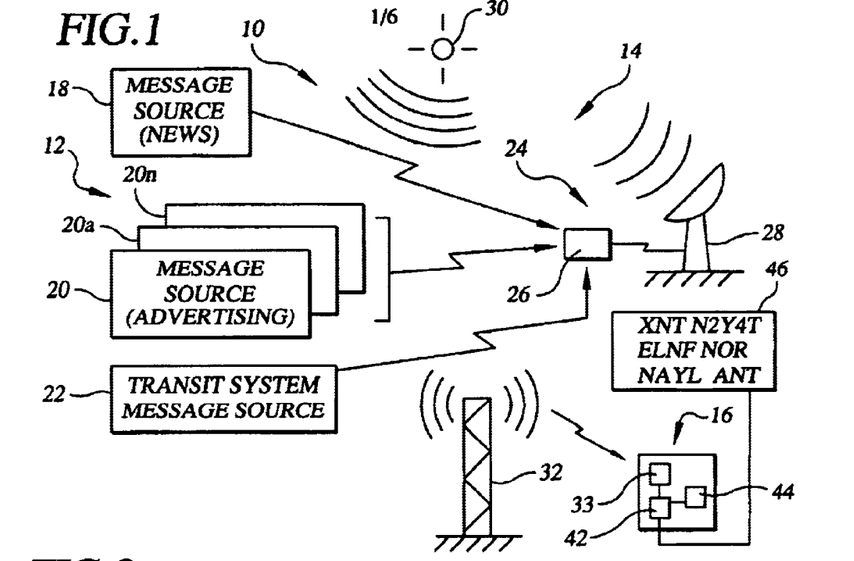
FIG. 1 illustrates a schematic illustration of the informational message communication and display system according to an embodiment of the present invention.

Referring now in more detail to the drawings in which like parts have like identifiers, FIG. 1 provides a schematic illustration of the informational message communication and display system 10 according to an embodiment of the present invention. The system 10 includes at least one message source generally 12 which originates messages for communication by wireless apparatus generally 14 to a plurality of display devices 16 for display to the public, preferably in mass transit stations, in a sequence of the messages stored by each of the display devices, in accordance with the invention. In the illustrated embodiment, the wireless apparatus is paging technology, although other wireless apparatus such as cellular or other technology may be gainfully used. The illustrated embodiment provides a news message source 18, a plurality of advertising message sources 20, and a mass transit message source 22. These message sources 18, 20, and 22 independently originate informational messages for communication to selected display devices 16 which subsequently display the messages received and stored by the particular display device, as discussed below. The news message source 18 originates news messages; the advertising message source 20 originates advertising messages; the mass transit message source 22 originates informational messages relevant to transit riders.

The message sources 12 communicate the messages to a message distributor generally 24. In the present embodiment, the message distributor 24 comprises a pager messaging system having a message distribution center 26 with an uplink station 28 that communicates the messages to satellites 30. The messages are transmitted to pager transmission towers 32 for broadcast to selected display devices 16. Each display device 16 has a pager transceiver 33 for receiving messages based on one of a plurality of cap codes assigned to particular pager transceiver. A preferred pager transceiver is a Motorola CreataLink 2-way transceiver. Further, the display device 16 is capable of acknowledging the receipt of the message by paging a receipt message to a communications system administrator.

Figure 2:
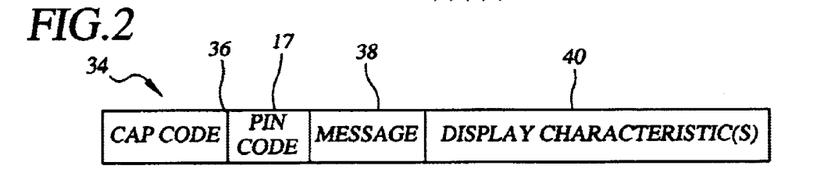
FIG. 2 illustrates a message record originated by a message source in the informational message communication and display system illustrated in FIG. 1.

With reference to FIG. 2, the message source 12 generates a message record 34 that includes a cap code 36, a pin code 37, a message 38, and at least one display characteristic 40 associated with the message 38. The cap code is an identifier associated with the particular display device 16 to receive the message record 34, as discussed below. The pin code 37 identifies one of a plurality of message memory slots associated with the particular display device 16 to receive the message 38 and the display characteristics 40. In an alternate embodiment, the message record 34 includes a start date and time and a stop date and time for display of the message 38.

Each display device 16 includes a microprocessor-based controller 42 with a conventional pager transceiver and data storage device 44 for receiving, storing, and displaying a plurality of the messages 38 in a selected sequence. The display device 16 also includes an image display screen 46 for visually presenting the message 38. Such image display screens 46 include LED displays, liquid crystal, plasma, conventional video screen, and other such devices for displaying visually perceived images.

Figure 9:
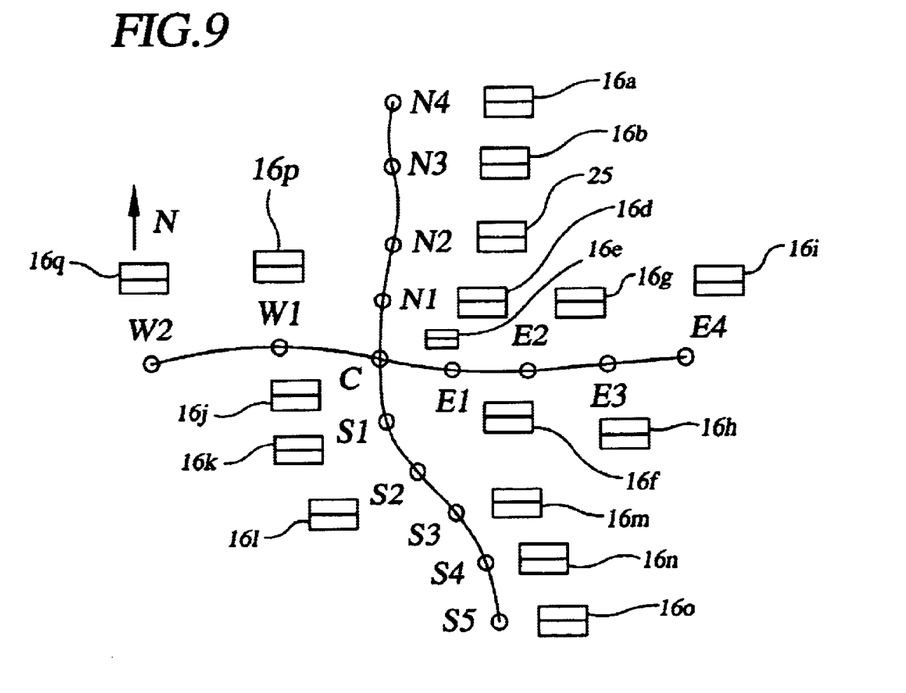
FIG. 9 is a route chart for a transit system using the informational message communication and display system of the present invention.

FIG. 9 is a route chart for a transit system on which a plurality of transit stations are indicated by circles. The transit system provides a substantially north-south line and an east-west line. A display device 16a–16p is positioned in a respective one of the transit stations. Each transit station is denominated by a direction and station number, for example, N1, N2, N3, and N4, for the four stations north of a central station C. The east, south, and west stations are similarly denominated. These stations likewise may have a station name (not illustrated), for example, Broad Street, Arlington Village, as appropriate for the particular transit system. The display devices 16 have at least one cap code, but in an alternate embodiment, have up to four cap codes. This permits hierarchal access to the display devices 16. For example, the display device 16 at station N1 is accessed by its unique cap code, but may have a cap code in common with each of the North stations. In that way, a message can be directed to only the North stations in the transit system. It is noted that display devices 16 can be mounted on both sides of the transit line (for example, North-bound and South-bound). Each display device 16 is separately identified with the cap code for selective access. Using another cap code, each display device 16 on the North-bound line has a common cap code whereby North-bound messages can be displayed differently from South-bound messages. Further, the informational message system of the present invention includes display devices 16 mounted to moving vehicles such as buses and trains, in stations, in shelters, both exterior and interior.

Figure 3:
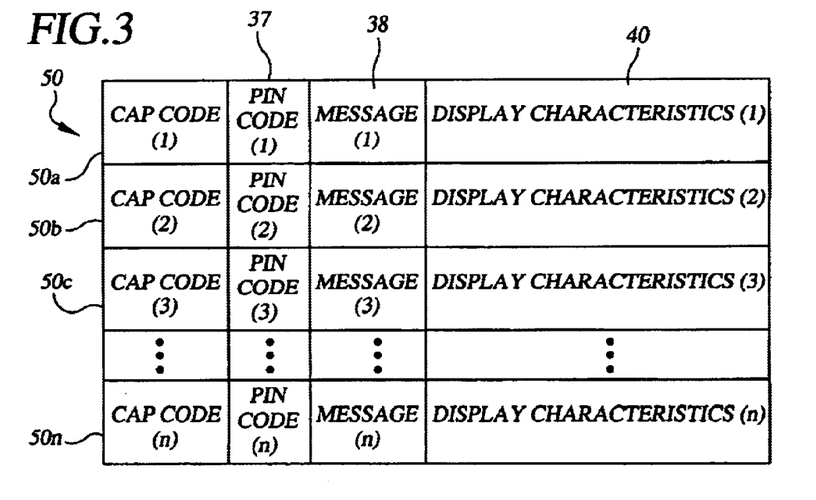
FIG. 3 illustrates message records received by a display device from the message sources in the informational message communication and display system illustrated in FIG. 1.

Each display device 16 receives and stores a plurality of messages in a plurality of message sloth. FIG. 3 illustrates a memory storage device 48 having a plurality of message slots 50n, where n identifies a particular message slot However, in the description that follows, reference numeral 50 is used to refer to the message slots in general. Each slot 50 is identified by a pin code 37, using conventional pager memory apparatus. The pager transceiver stores in the designated message slot 50 the message 38 transmitted by the message source 12 together with the display characteristics 40 for the message. The message 38 in the preferred embodiment comprises text information. The display characteristics 40 define the appearance and presentation of the message 38 on the image display screen 46. The display characteristics 40 include the size and color of the letters, the duration of the display presence of the text, the style of presentation of the text, the font and style of the letters in the message, logo identifiers associated with the displayed message. The style of presentation refers to the manner in which the message is displayed, for example, scrolling top to bottom, left to right, one character at a time, and the like.

In a preferred embodiment, the display device 16 has capacity for 56 messages, although each display device may not receive a message for all slots. The number of slots 50 is dependent upon the available memory capacity of the transceiver The display device 16 displays the plurality of messages held in the storage 44 in a predetermined sequence. If a slot is clear and has no message, the message in the next slot in sequence with a message is displayed. In one embodiment, the display device 16 uses sixteen of the message slots 50. Eight pin codes corresponding to eight of the slots 50 are assigned to the news information source 18. These slots receive the news information messages. Seven of the pin codes are assigned to advertising informational messages. The advertiser sources 20 are each assigned one, or more, of the pin codes for providing messages to display devices. For example, an automobile manufacturer may lease display rights to one of the pin slots while another advertiser leases another of the pin slots for providing advertising messages to selected display devices 16. One pin code is assigned to the mass transit message source 22. Each message source 18, 20, and 22 provide messages for the display devices. The messages are displayed in sequence. For example, the 16 messages may be displayed in a sequence of two news informational messages followed by two advertising messages. Typically, the news informational messages are displayed for 30 seconds; each advertising message is displayed for 15 seconds. The total display time for the 16 messages is 6 minutes. The sequence of display then repeats. If a particular message slot 50 is empty (that is, there is no message 38 in the particular slot 50) the sequencing skips the no message slot and continues displaying the messages in the slots 50 in sequence.

Figure 4:
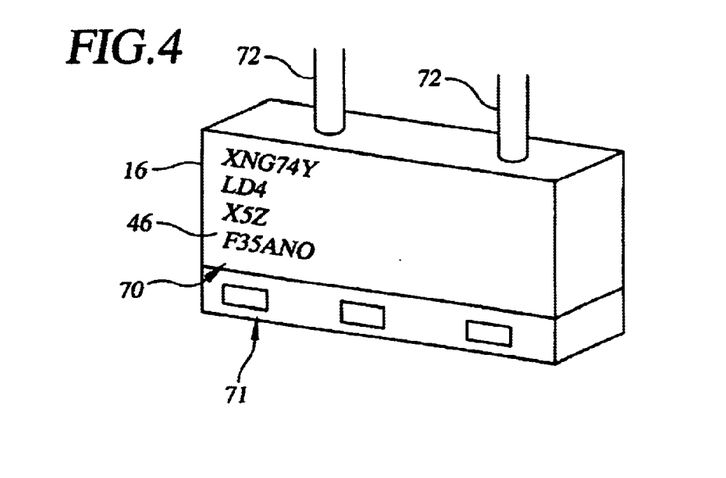
FIG. 4 is a perspective view of an embodiment of a display device for communicating informational messages to the public (shown in a transportation station), to illustrate a use of the informational message communication and display system illustrated in FIG. 1.

FIG. 4 is a perspective view of an embodiment of a display device 16 for communicating informational messages to the public on the visual display 46 (shown in a public transportation station), to illustrate a use of the informational message communication and display system 10 illustrated in FIG. 1. The display device 16 in the illustrated embodiment has the ornamental appearance of an enlarged pager with a visually perceived screen 46. The visual display 46 in the illustrated embodiment provides a four-line by twenty-character text display 70 and the arrows 71 comprise pager-related ornamental buttons. The display device 16 is shown suspended by supports 72 from a ceiling in a transit station. In an alternate embodiment, the display device 16 mounts to wall surfaces or on poles. In an alternate embodiment, the display 46 is an eight-line LED color display, with one of the lines reserved to the transit system for providing station-specific information. For example, the transit system may use green text to indicate the station is open, yellow text to indicate delay, and red text to indicate the station is closed. Appropriate messages such as the station name or the rate of arrival of transit cars can be displayed.

In practicing the present invention, the display devices 16 display the plurality of messages held in the storage 44 in a predetermined sequence. In one embodiment of the method of communicating informational messages, the present invention alternates display of one message of eight news information messages with one message of eight advertising messages. Upon completion of the display of the sixteen messages, the cycle repeats. In yet another practice, the sequence of messages provides two advertising messages followed by two news items. Upon completion of display of the messages, the cycle repeats. There are various sequences that can be set for the display devices.

In the preferred embodiment, the news messages are generated by the news source 18 which preferably is a news gathering and reporting service. The news source 18 originates text messages containing the news in various categories including Features, Show Business, Business, US News, Weather, World News, Financial Markets, and Sports. Each of these categories is assigned to one of the news "slots" based on the pin code. Accordingly, each of these categories is associated with one of the pin codes. It is noted that each display device 16 may contain identical pin codes. For example, each display device 16 may be configured to receive the Features messages from the news source 18. Each display device 16 would thus include the appropriate pin code for receiving Features messages. The news source 18 identifies the display devices 16 to receive the news message and its display characteristics. For news messages, the system 10 preferably does not use different fonts or style effects, but merely displays the text news on the image display 46.

Upon completion of the news message record 34, the news source 18 transmits the message record to the message distributor 24 preferably over secure telephone line or other secure communication mechanism. The message distributor 24 receives the message record 34 and distributes the message record to the selected display device 16 using conventional pager messaging apparatus. This is accomplished in the illustrated embodiment by the message distributor 24 sending the message record 34 through the uplink station 28 to the satellite 30. The message record 34 is then transmitted to a pager transmission towers 32 for broadcast to the selected display device 16 based on the cap code. Each display device 16 containing the particular cap code receives the message record 34. In a preferred embodiment, the display devices 16 utilize pager receivers for communicating messages. Upon receipt of the message record 34, the display device 16 stores the message 38 and the display characteristics 40 in the storage 44. The message 38 is then available in the display device 16 for presentation on the image display 46 in the sequence of messages displayed by the display device 16.

Similarly, advertising messages are originated and communicated as message records 34 to selected display devices 16. In the illustrated embodiment, the advertising source 20 originates the advertising messages. The selected display device 16 to receive the message is identified. The system 10 assigns the pin code for the advertiser for the selected display device 16. For example, a manufacturer of sports equipment may have assigned to it the slot or pin code immediately following the sports news item. The text and display characteristics are completed and the complete message record 34 is communicated to the message distributor 24 for distribution to the selected display device 16, as discussed above in relation to the news message.

It is noted that the display devices 16 continuously cycle the presentation of messages 38, and that new messages (either news or advertising) can be slotted into storage for the display device 16 based on the particular cap code and pin code in the message record 34. The controller on the display device 16 prevents a message from being inserted while the message in the particular slot identified by the pin code is being displayed.

The message sources 18, 20, and 22 each require appropriate microprocessor computers for creating the message records 34 and communicating the message records to the message distribution center 24. These computers preferably are 233 Mhz MACINTOISH POWER computers, 200 Mhz PENTIUM II computers, or higher, with appropriate conventional memory, hard drive, video monitor, and modem. In a preferred embodiment, the message sources have HTML-based microprocessor capability.

Each display device 16 includes a backup power supply in the event a main supply of power to the display device is lost. Further, the display device 16 may be interrogated as to the contents of its memory 48 so as to provide reports to the advertisers of the display of advertising messages. In an alternate embodiment, the display device 16 selectively confirms receipt of a particular message from the advertising source 20.

The display devices 16 include cache memory which stores default messages for selected slots, as well as certain controls for message displays. To reduce bandwidth loading on the message distribution channels, a message having a control identifier is communicated to the selected display device. The control identifier instructs the display device to insert the default message into the specified slot 50. Another control character in the message instructs the display device 16 to access cached display characteristics, for example, scrolling, duration, or other. In an alternate embodiment, the display device 16 caches multiple versions of a message, for example, a fast food advertisement. The display device 16 rotates the versions in sequence after display of one of the versions during the sequenced display of the messages in the slots 50.

Logos and graphics having high character or instruction content are preferably cached in memory of the display device 16, so that such do not have to burden the bandwidth. Rather, the system administrator communicates the logos and with appropriate control instructions, directs the display device to store the logo graphics in memory. The logo is then accessed by control characters within the message communicated by the advertiser. Of course, logo graphics instructions can be loaded manually and directly into the memory on site using conventional computer interconnection mechanisms, such as local network connections.

The system 10 is usable for broadcasting emergency messages, such as those provided by the emergency alert notification system operated by civil defense and emergency management authorities. Further, in such events, a text-to-audio device with a speaker provides audio of the emergency message.

Figure 5:
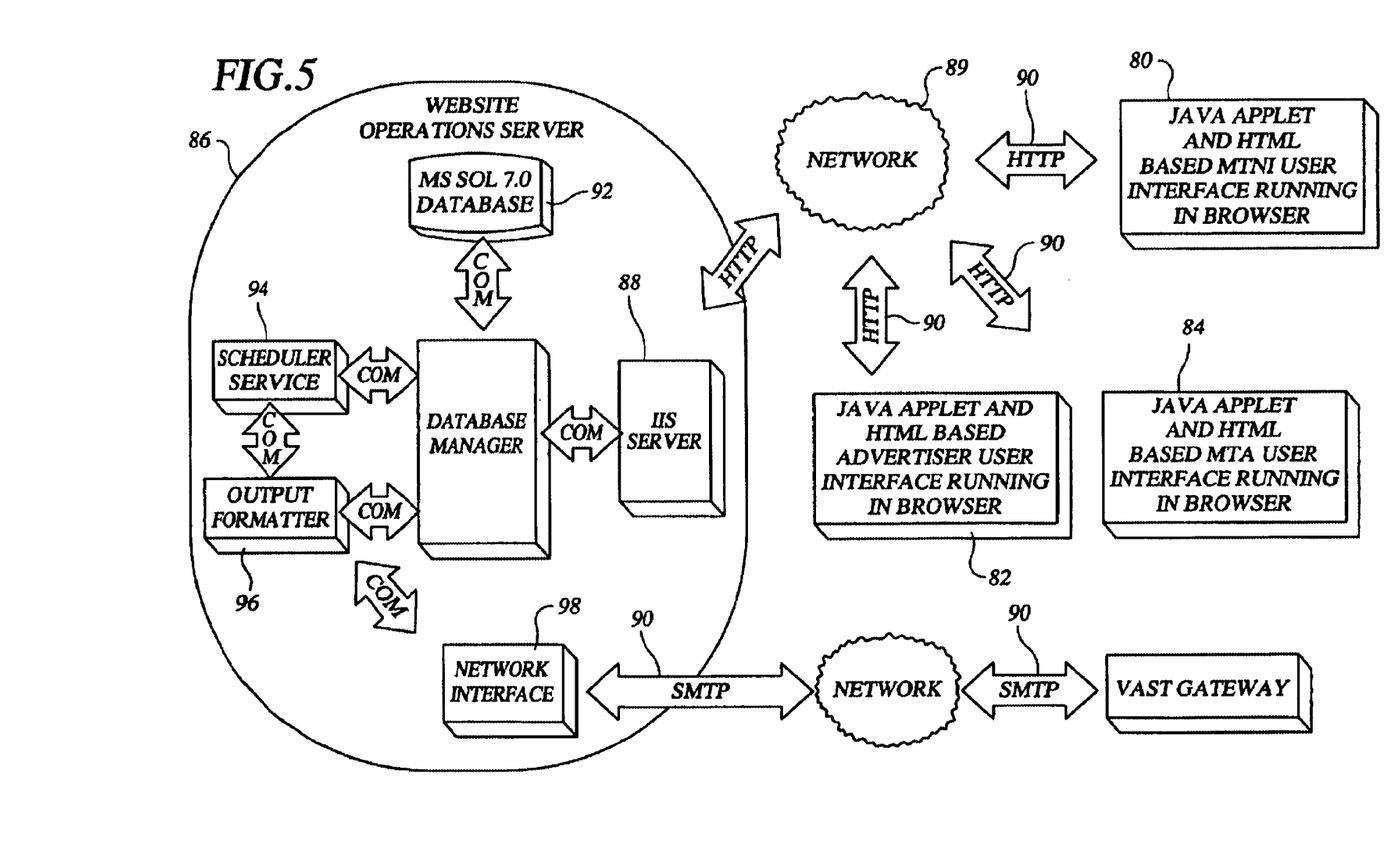
FIG. 5 is a schematic diagram showing interconnections of the informational message communication and display system according to the present invention.

FIG. 5 provides a schematic diagram showing interconnections among the message sources 12 comprising a systems administrator 80, at least one advertiser 82, and a transit system administrator 84, in a preferred embodiment of the informational message communication and display system 10. The message sources 12 communicate with the informational message communication and display system 10 through an interactive web site 86 provided by an ISP server 88 having interconnections to an interactive computer network generally 89. Conventional telecommunication channels generally 90 carry the communications between the message sources 12 and the web site 86 through the interactive computer network 89. The web site 86 provides an interactive display for use by the systems administrator 80, the advertiser 82, and the transit system administrator 84 to create messages and designate the display devices 16 to which the messages are transmitted. Preferably, the interactive display on the web site 86 comprises JAVA applet and HTML-based instructions for an interactive interface operated by the web site 86 and communicated through the ISP server 88. The web site 86 includes a database 92 that is operated and controlled by the system administrator 80. A scheduler 94 and output formatter 96 communicates with the database. The scheduler 94 sequences the transmission of messages to the selected display devices 16. The output formatter 96 formats the messages for communication through a network interface 98 for communication to the message distribution center 24 for paging broadcast to the selected display devices 16.

Figure 6:
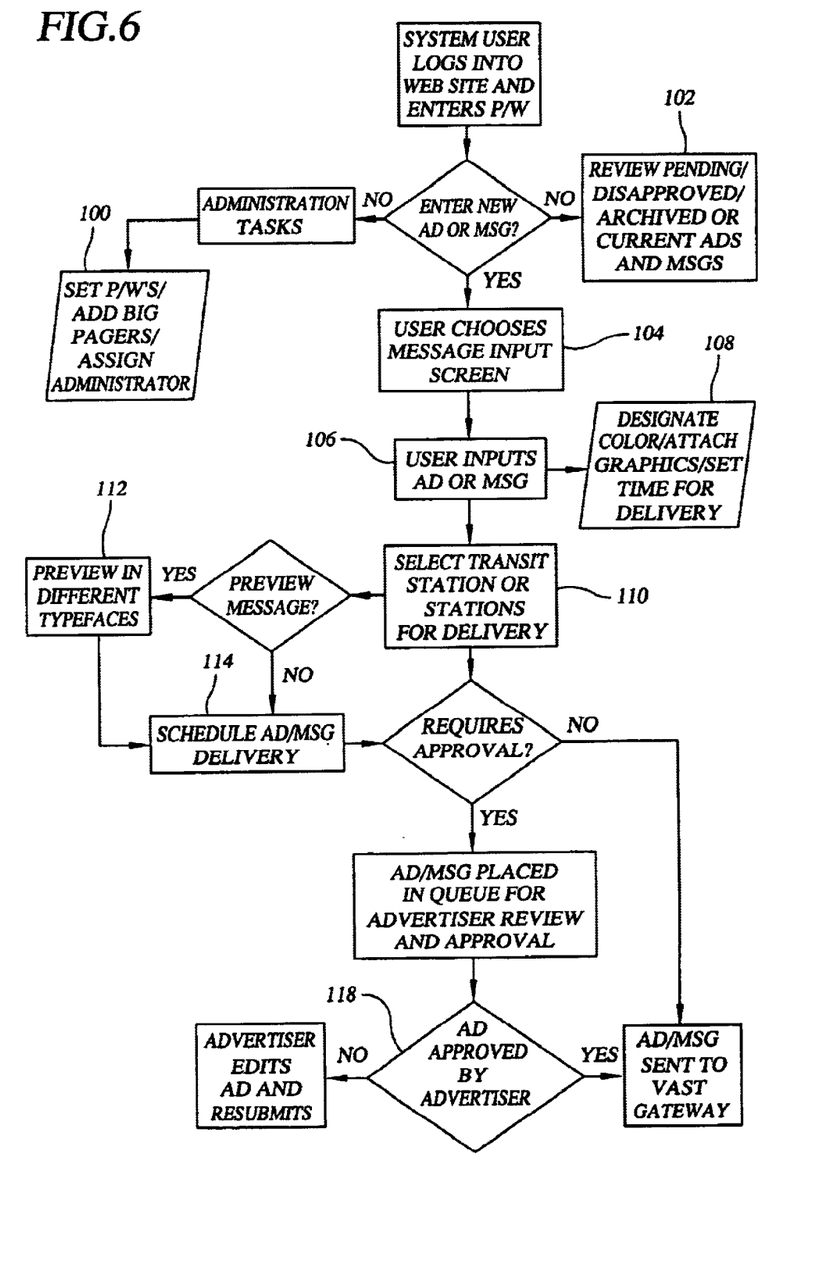
FIG. 6 is a flow diagram for a systems administrator for the informational message communication and display system illustrated in FIG. 5.

FIG. 6 is a flow diagram for a systems administrator for the informational message communication and display system 10 illustrated in FIG. 5. The systems administrator 80 accesses the web site 86 through the ISP server 88. The systems administrator 80 performs administrative functions 100 for the informational message communication and display system 10. These functions include setting and modifying passwords for security on the system 10, adding and modifying control and site information for display devices 16, maintains the database files which associate the advertisers and the particular display devices 16 for each as well as the period for which the advertisers have rights to use the message slots 50, and other administrative tasks. Further, the systems administrator 80 can perform review and modification 102 of archived informational messages. Archived messages generally are ones which are repeated periodically. These messages are stored in the database for recall and transmission to selected display devices 16. The systems administrator also approves advertising messages for display, as is typical in broadcast and print media services.

The systems administrator 80 also creates 104 a new message. The message input screen 106 is displayed and the systems administrator 80 enters the new message. This is accomplished by entering the text as well as designating 108 the color of the text, the graphics if any, and the time for delivery of the message. The systems administrator 80 selects 110 the particular display devices 16 to receive the message. The message may be previewed 112 on a display device accessible to the systems administrator or on a computer screen during editing. The message is scheduled for communication 114 and the output formatter places appropriate header information for communicating the message to the message distribution center 24. If the message is one that requires advertiser approval, the message is first communicated 118 to the advertiser. Otherwise, the message is communicated 119 to the distribution center 24.

Figure 7:
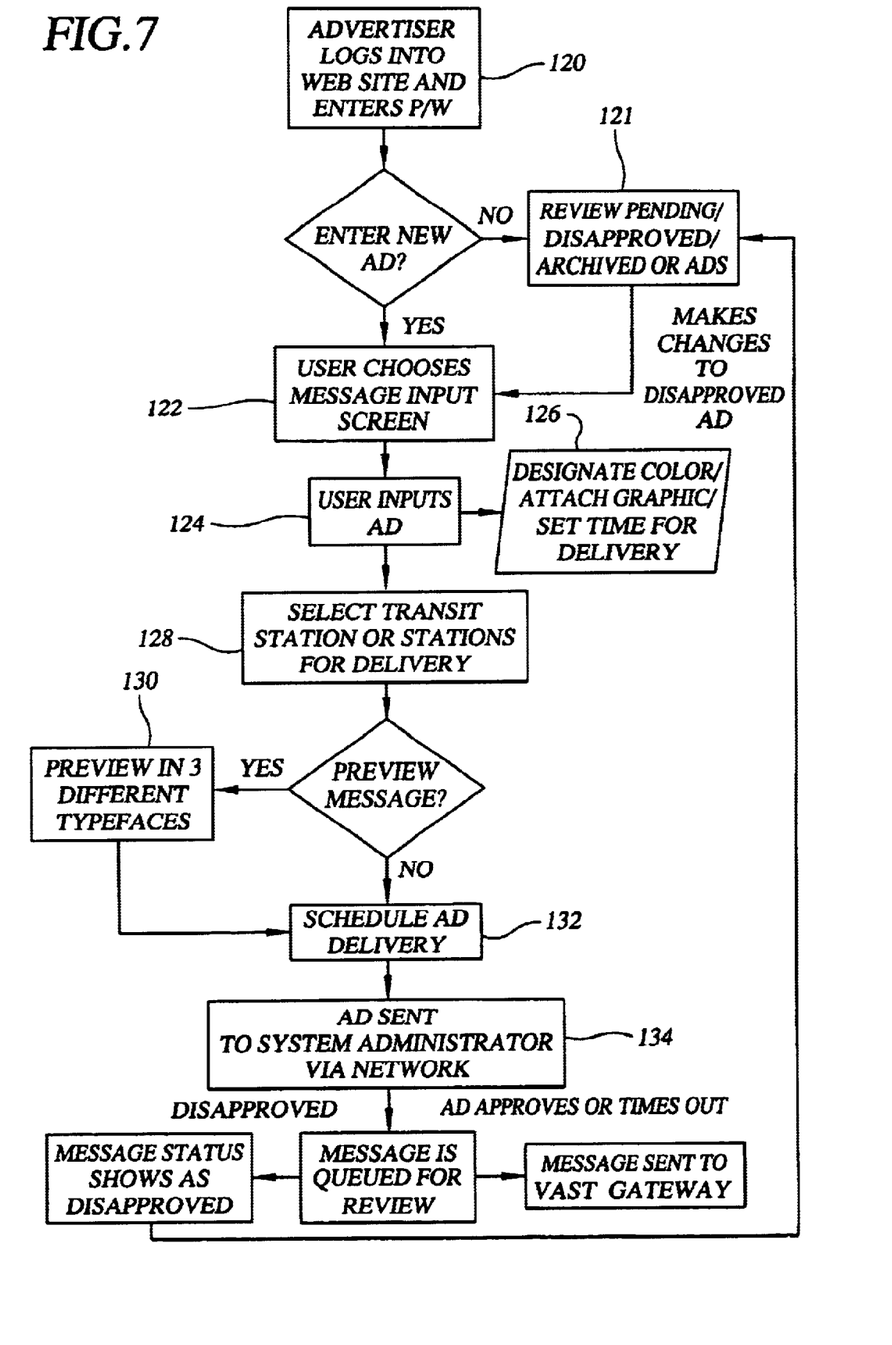
FIG. 7 is a flow diagram for an advertiser placing informational messages in an assigned message slot of displays in the informational message communication and display system illustrated in FIG. 5.

FIG. 7 is a flow diagram for the advertiser 82 placing informational messages in an assigned message slot of display devices 16 in the informational message communication and display system 10. The advertiser 82 accesses the web site 86 through the ISP server 88 and complies with required password and security procedures. The advertiser 82 accesses 120 the database on the web site 86 for review 121 of archived messages and pending messages, if any, created by the system administrator 80. A message is selected 122 for creation or review. The message is edited 124 which includes entering 126 appropriate text and designation of display characteristics including color, display features, graphics and time of delivery. The particular display devices 16 to receive the message are selected 128, for example, at one or more transit stations. The advertiser 82 selectively previews 130 the appearance of the message on the computer display associated with the microprocessor used by the advertiser. If the message is unsatisfactory, further editing is done. Otherwise, the message is approved for communication. The message is communicated to the system administrator for approval, as discussed above. If the message is approved, the scheduler 94 and output formatter 96 prepare 132 the message for communication 134 through the network interface 100 to the message distribution center 24. If the message is not approved, the message is returned to the advertiser source 20 for further editing.

The system administrator 80 creates a second message record having the cap code and the pin code, together with a stop time. If no stop time is specified by the advertiser, the default stop time is the expiration date/time for the particular advertiser's right to use the particular display device 16 identified by the cap code and pin code. This second message is held in the database 92. Using the clock of the microprocessor operating the database, the second message is released for communicating at the appropriate time. If the advertiser specifies the start time, the message is also held in the database 92 for subsequent communication at the selected time. If no start time is specified, the message is communicated upon approval by the system administrator.

Figure 8:
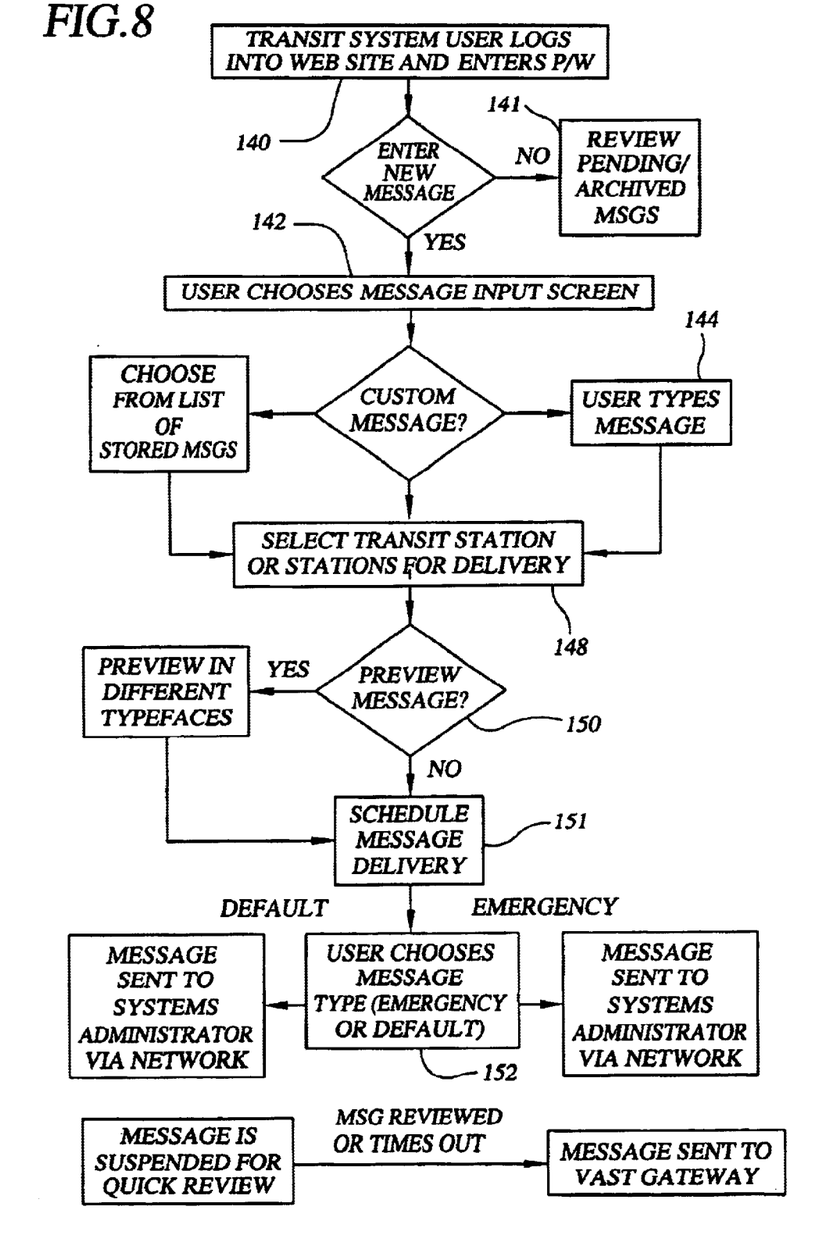
FIG. 8 is a flow diagram for a transit message administrator for the informational message communication and display system illustrated in FIG. 5.

FIG. 8 is a flow diagram for the transit message administrator 84 for placing messages in a selected one of the assigned message slots in display devices 16. The transit message administrator 84 accesses the web site 86 through the ISP server 88 and complies with required password and security procedures. The transit message administrator 84 accesses 140 the database on the web site 86 for review 141 of archived messages and pending messages, if any, for example, messages created by the system administrator 80. A message is selected 142 for creation or review. The message is edited 144 which includes entering appropriate text and designation of display characteristics including color, display features, graphics and time of delivery. The particular display devices 16 to receive the message are selected 148, for example, at one or more transit stations. The transit message administrator 84 selectively previews 150 the appearance of the message on a display device 16. If unsatisfactory, further editing is done. Otherwise, the message is approved for communication. The scheduler 94 and output formatter 96 prepare the message for communication 151 through the network interface 100 to the message distribution center 24.

In the event of emergency, the transit message administrator 84 designates 152 the message as emergency. The scheduler 94 and output formatter 96 communicate the emergency message through the network interface 100 to the message distribution center 24. The emergency message is thereafter received by the designated display devices 16. The selected display devices 16 suspend the cyclic display of the messages and display only the emergency message. For example, the particular station may be closed due to damage. The emergency message may inform persons to evacuate the area or provide other necessary information for instruction and direction of persons in the area as to the problem and actions to be taken for safety and security.

In the practice of the present invention, the transit system can designate five message characteristics: normal, delay-1, delay-2, emergency-1, and emergency-2. In emergency-1 messages, the transit system signals the display device 16 to interrupt the display of the news messages for display of the emergency message. The display device 16 then resumes its cycle of displaying the messages in sequence. For an emergency-2 message, the display device 16 interrupts all messages and only displays the emergency message. The cycle of news and advertising messages is resumed upon communication of a release message. Delay-1 and delay-2 messages similarly control display of messages at a particular display device 16, whereby transit delays or station problems can be communicated.

In a preferred embodiment, the display devices 16 are identified by a hierarchical sequence, in order that the display devices 16 may be selected more easily. For example, transit systems often designate the particular routes for the transit vehicles with a plurality of stations on the routes. Each station has an identifier, such as a name or number. Accordingly, the display devices 16 may be selected by the route, by direction on the route (for example, all display devices that are on an eastbound direction of travel), by portion of the route (for example, all display devices east of a central station), by zip code, or individually. Further, demographic characteristics associated with each display device may be useful for an advertiser in placing of the information messages.

Format of Pager Messages:

There are three Pager message formats. (The code may be two characters, to reduce bandwidth loading).

"NNN-xx" followed by message characters, where "NNN" is an identifier of the originating source of the message and "xx" is any two characters corresponding to the message slot in which the message is to be placed when sent by the message distribution center 24 to the selected display devices 16.

"ADD-xx" followed by message characters, where "ADD" is an identifier of the originating advertiser of the message and "xx" is any two characters corresponding to the message slot in which the message is to be placed when sent by the message distribution center 24 to the selected display devices 16.

"CTL-xx" followed by message characters, where "CTL" is a control code identifies functions for execution by the display device 16 and "xx" is any two characters corresponding to the message slot involved.

An initial list of messages in a sixteen-slot embodiment of the display device 16 is:

| | |
|---|---|
| ADD-01 | NNN logo |
| ADD-02 | blank, not displayed |
| NNN-03 | U.S. News |
| NNN-04 | World News |
| ADD-05 | advertiser logo |
| ADD-06 | blank not displayed |
| NNN-07 | Business news |
| NNN-08 | Markets |
| ADD-09 | Advertisement |
| ADD-10 | Advertisement |
| NNN-11 | Sports news |
| NNN-12 | Feature news report |
| ADD-13 | Advertisement |

-continued

| | |
|---|---|
| ADD-14 | Transit system message |
| NNN-15 | Weather |
| NNN-16 | Show business/Hollywood |

Messages received with the same header (NNN-xx or ADD-xx) will replace the existing message.

Messages with a new header (such as NNN-xx or ADD-xx) will be added to the list in the first empty message position.

NNN-xx Messages:

In the illustrated embodiment, when received by the display device 16, the "NNN-xx" messages are automatically formatted to fit in a 20 character wide by 4 line tall display. "Line-Feeds" are inserted into "NNN-xx" messages.

ADD-xx Messages:

When received by the display device 16, the "ADD-xx" messages are not automatically formatted. Formatting of the "ADD-xx" messages is the responsibility of the source, as discussed in one embodiment below.

To enter a "Line-Feed" into an "ADD-xx" message, enter the character string:

{lf} note: lower case required

To enter a "{" character into an "ADD-xx" message, enter the character string:

{{}

To enter an "Escape" character into an "ADD-xx" message, enter the character string:

{esc} note: lower case required

Escape Sequences:

The following "escape" sequences work in the Pager Led Sign. Use of "escape" sequences that are not listed below will cause problems.

| | |
|---|---|
| {esc}Q nn | Select Character Font |
| {esc}S | Blink on |
| {esc}T | Blink off |
| {esc}U | Reverse on |
| {esc}V | Reverse off |

Example of an "ADD-xx" Message:

ADD-02Test add-02 message {;f} notice the line feed {lf} Line 2 {lf}
{esc}Sthis is
blinking{esc}T(lf} {esc}QOILarge{lf}Characters{lf}
    {esc}OO{esc}U {lf} Reverse {esc}Sblink{esc}T    {lf}
{lf} {esc}V
where:

| | | |
|---|---|---|
| ADD-02 | header | |
| Test add-02 message {lf} | | text |
| notice the line feed {lf} | | text |
| Line 2 {lf} | | text |
| {esc} S | | blink on |
| this is blinking | | text |
| {esc} T | | blink off |
| {lf} | | line feed |
| {esc} QOI | | character font 01 |
| Large {lf} | | text |
| Characters {lf} | | text |
| {ese} QOO | | character font 00 |
| {esc} U | | reverse on |
| {lf} | 20 | spaces |
| Reverse | | text |

-continued

| | | |
|---|---|---|
| {esc} S | | blink on |
| blink | | text |
| {esc} T | | blink off |
| {lf} | | spaces |
| {lf} | 20 | spaces |
| {esc} V | | reverse off |

It is thus seen that an improved informational message apparatus and method has been disclosed for sources of informational messages to originate such messages, communicate such messages to selected display devices, and display such messages in selected sequence of messages. While this invention has been described in detail with particular reference to the preferred embodiments thereof, the principles and modes of operation of the present invention have been described in the foregoing specification. The invention is not to be construed as limited to the particular forms disclosed because these are regarded as illustrative rather than restrictive. Moreover, modifications, variations and changes may be made by those skilled in the art without departure from the spirit and scope of the invention as described by the following claims.

What is claimed is:

1. A method of displaying informational messages communicated from at least one message source by wireless apparatus to a plurality of display devices located in public facilities, particularly mass transit systems including stations and vehicles, for display of the informational messages to the public using such facilities, comprising the steps of:

(a) creating a plurality of message records, each message record generated by a message source, and including a message, a cap code which identifies at least one particular display device which is to receive the message, a pin code which identifies one of a plurality of message memory slots associated with the particular display device to receive and store the message, and at least one display characteristic associated with the message;

(b) communicating by wireless apparatus each of the message records from the message source to one or more particular display devices based on the cap code;

(c) storing the display characteristics and the message in one of the plurality of message memory slots associated with each particular display device based on the pin code; and (d) displaying on each particular display device the messages based on the display characteristics associated with each message in a selected sequence.

2. The method as recited in claim 1, further comprising the step of repeating step (d) continuously.

3. The method as recited in claim 1, further comprising the steps (a), (b) and (c) for communicating a new message and associated display characteristics therefor to the each particular display device based on the cap code in the message record, while the each particular display device simultaneously repeats step (d).

4. An informational message display system for displaying informational messages communicated from message sources by wireless apparatus to a plurality of display devices which each display the informational messages in a selected sequence, comprising:

at least one message source for creating a plurality of message records, each message record including a message, a cap code which identifies one or more selected display devices to receive the message, a pin code which identifies one of a plurality of message memory slots associated with each display device to receive and store the message, and at least one display characteristic for the message;

each one of the plurality of display devices having a storage means comprised of a plurality of message memory slots for storing a plurality of communicated messages and the display characteristics associated with each of said communicated messages, each display device having a transceiver which receives and stores each communicated message and the display characteristics based on the cap code and the pin code, and each display device having a visual display screen for displaying the stored messages based on the display characteristics for each of said stored messages;

means for communicating each of the message records from the message source to at least one selected display based on the cap code; and a controller associated with each display device for displaying on the visual display screen the plurality of messages based on the display characteristics associated with each message in a selected sequence.

5. The informational message display system as recited in claim 4, in which the controller continuously displays the messages in the selected sequence.

* * * * *